Oct. 21, 1969
D. M. PETERSON ET AL
3,473,456
PHOTOGRAPHIC CAMERA WITH METERED FILM ADVANCE AND DOUBLE
EXPOSURE PREVENTION
Filed Jan. 18, 1967
2 Sheets-Sheet 1
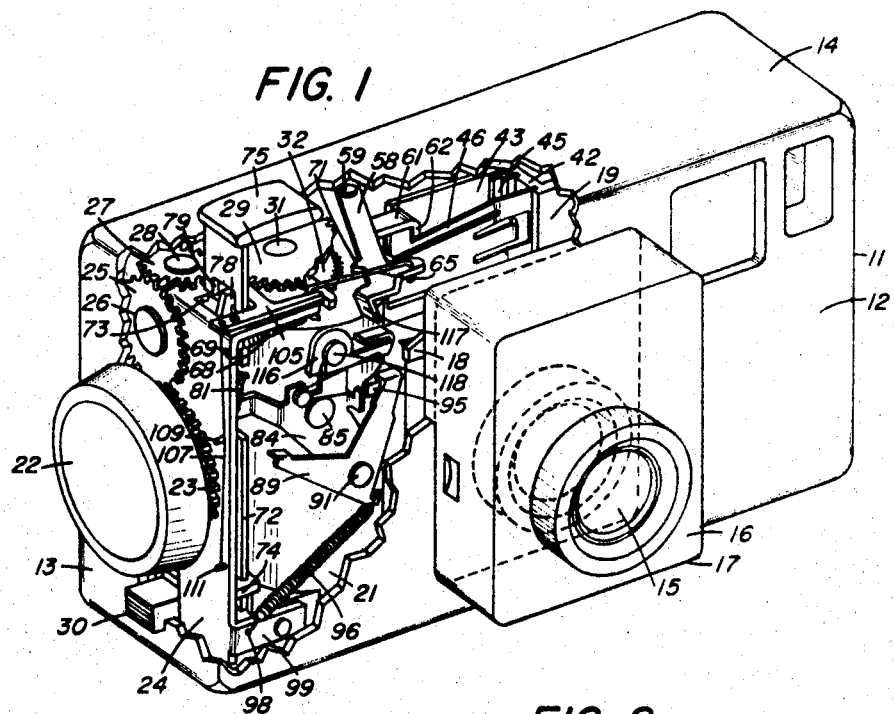
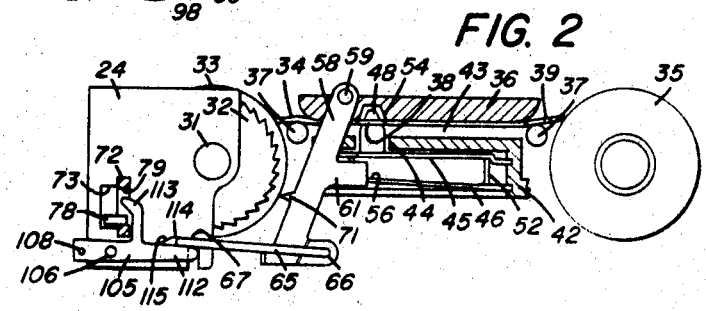
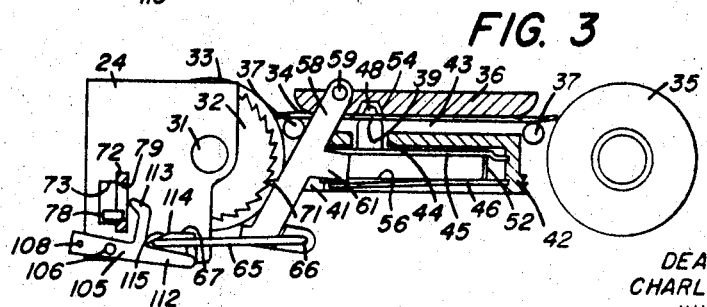
DEAN M. PETERSON
CHARLES E. PICKERING
WILLIAM WINDLE, JR.
INVENTORS
BY
ATTORNEYS

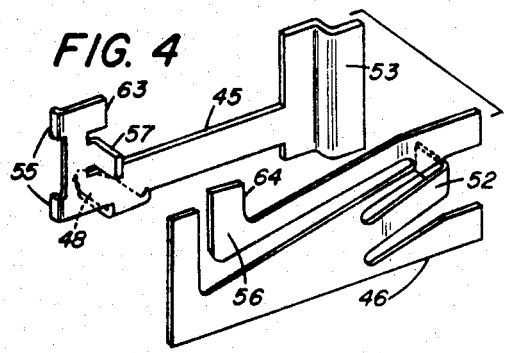
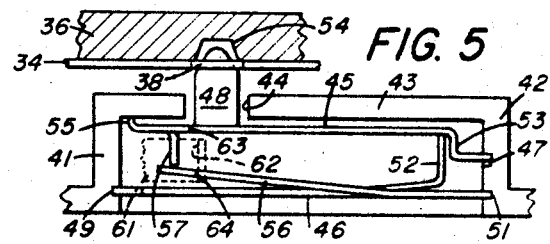
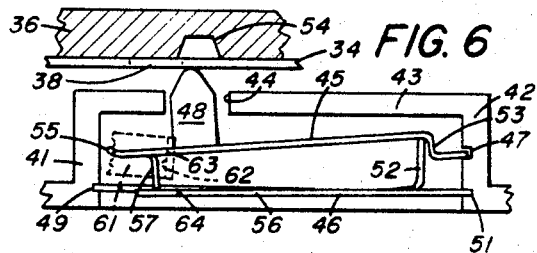
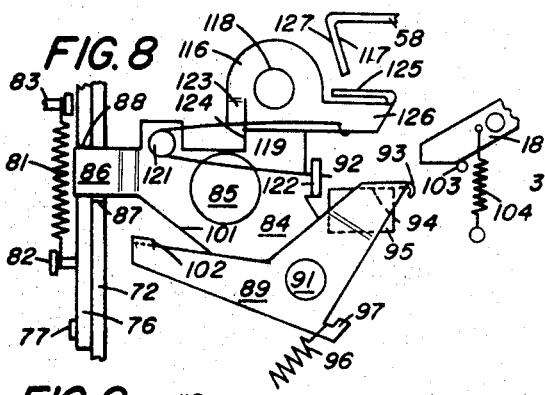
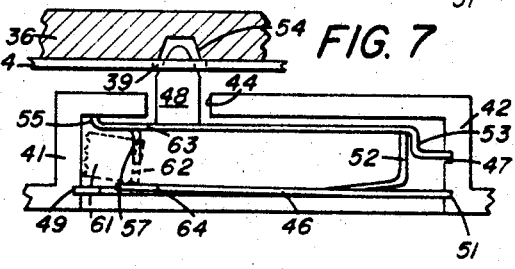
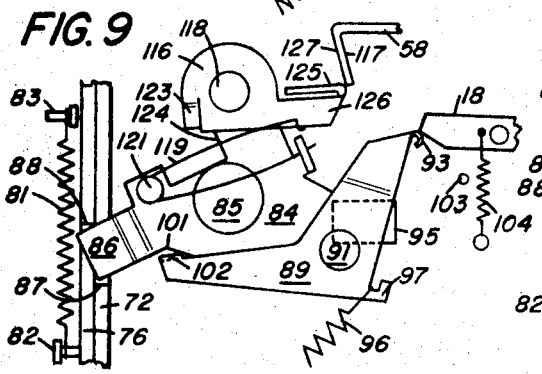
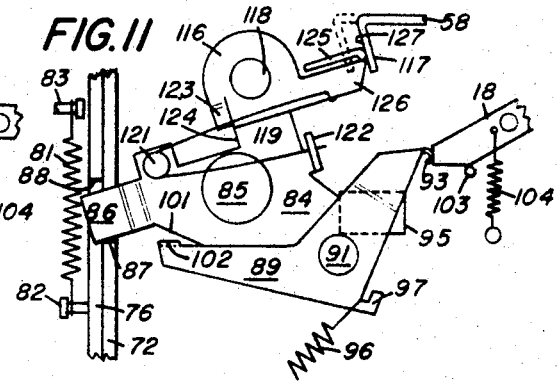
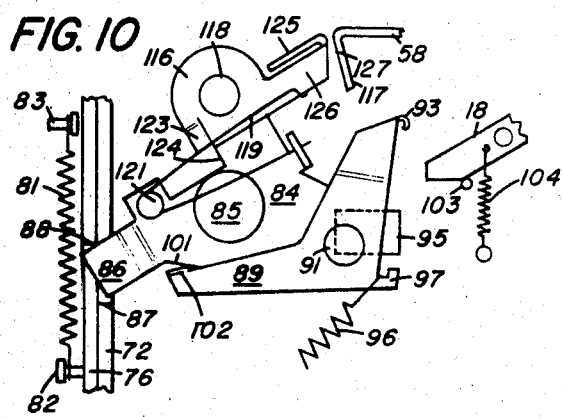
DEAN M. PETERSON
CHARLES E. PICKERING
WILLIAM WINDLE, JR.
INVENTORS

United States Patent Office 3,473,456
Patented Oct. 21, 1969

3,473,456
PHOTOGRAPHIC CAMERA WITH METERED FILM ADVANCE AND DOUBLE EXPOSURE PREVENTION
Dean M. Peterson, Charles E. Pickering, and William Windle, Jr., Rochester, N.Y., assignors to Eastman Kodak Company, Rochester, N.Y., a corporation of New Jersey
Filed Jan. 18, 1967, Ser. No. 610,110
Int. Cl. G03b 19/04
U.S. Cl. 95—31           11 Claims

ABSTRACT OF THE DISCLOSURE

A camera has a compact metering mechanism to control film advancement. An associated double exposure prevention system blocks operation of the shutter until the film is wound after a preceeding exposure. A metering pawl engages spaced metering holes in the film and upon movement of the film controls the movement of several latching surfaces on two resilient strips. These surfaces regulate movement of another pawl for preventing film winding when an unexposed frame is in position and for preventing, through an associated linkage, shutter operation until an unexposed frame is moved into position for exposure.

---

Reference is made to the following commonly assigned copending applications:

U.S. application Ser. No. 610,087, Photographic Camera With Retractile Lens Housing, filed on even date herewith in the names of James F. Scudder and Frederic A. Mindler.

U.S. application Ser. No. 610,055, Photographic Camera With Retractile Lens and Shutter Trigger, filed on even date herewith in the names of Dean M. Peterson, Charles E. Pickering and William Windle Jr.

The present invention relates to photographic cameras and more particularly to film advancing and double exposure prevention systems incorporated in roll film cameras.

An important object of the present invention is to improve the compactness of a camera adapted to employ roll film of a predetermined size, to enable the camera to be carried conveniently in a shirt pocket or in a container of similar size, without eliminating desirable camera features or unduly congestng the mechanism associated therewith in achieving such such compactness.

As the film is advanced in the camera, it is desirable to provide metering means for arresting the film winding mechanism automatically as each successive exposure area is moved into its proper exposure position relative to the camera lens, thereby eliminating the necessity for visual observation of the film winding operation. One means for providing such a metering feature is incorporated in the pre-loaded film magazine disclosed in United States Patent No. 3,128,081. In such film magazines, which are particularly appropriate for use in cameras according to the present invention, the filmstrip is provided with a metering hole adjacent each exposure area. When the magazine is installed in an appropriate camera, a metering pawl engages the edge of the filmstrip in alignment with the metering holes and arrests the film winding mechanism when the pawl senses a metering hole. The present invention simplifies the construction and mode of assembly of such a film metering system to provide an inexpensive and reliable mechanism particularly suited for use in compact cameras, in which the space occupied by internal mechanisms must be minimized.

Similarly related to the space limitations associated with the compact cameras, the invention simplifies incorporating in such cameras a double exposure prevention device that is positive, reliable and inexpensive.

To reduce to a minimum the external dimensions of the camera when it is not actually being used, the film winding knob is relocated on an end wall of the camera, and the lens and its associated shutter structure may be mounted in a housing which is retractile into the body of the camera. Therefore, the invention also realizes the foregoing objectives in a manner compatible with such a retractible lens assembly construction.

These and other important objects and advantages of the invention will be apparent from the following detailed description, reference being made to the accompanying drawings in which like numerals refer to like elements and in which:

FIG. 1 is an enlarged perspective view of a camera according to a preferred embodiment of the invention, with portions broken away to show the internal construction thereof;

FIG. 2. is a top view of internal elements of the camera comprising the film metering and double exposure prevention systems, with the illustrated components depicted in the positions assumed thereby following an exposure and before the film has been advanced.

FIG. 3 corresponds to FIG. 2 and shows the illustrated components in the positions which they assume when the film has been advanced to position a succeeding exposure area in alignment with the camera lens system and before the shutter has been operated.

FIG. 4 is a perspective view of the metering pawl member and the resilient latch member employed in the illustrated camera, with the two members shown in exploded relation to one another;

FIG. 5 is a partial top plan view comprising an enlargement of a portion of FIG. 2, showing the relative positions of the illustrated components following an exposure but before the film has been advanced;

FIG. 6 corresponds to FIG. 5 and shows the relative positions of the illustrated components as the film is advanced from the position shown in FIG. 5 but before the succeeding exposure area has moved into proper alignment with the camera lens system;

FIG. 7 corresponds to FIGS. 5 and 6 and shows the relative positions of the illustrated components, as also shown in FIG. 3, when the film has been advanced to bring the succeeding exposure area into alignment with the camera lens system but before the shutter has been operated to expose that exposure area;

FIG. 8 is an enlarged front plan view of the shutter operating mechanism and the elements associated therewith to reset the metering and double exposure mechanism, with the illustrated components shown in positions assumed thereby prior to depression of the shutter trigger to effect an exposure;

FIG. 9 corresponds to FIG. 8 and shows the illustrated components in the positions that they assume during depression of the shutter trigger;

FIG. 10 corresponds to FIGS. 8 and 9 and shows the positions of the illustrated components when the shutter trigger has been depressed fully; and FIG. 11 corresponds to FIGS. 8, 9 and 10 and shows the illustrated components in the positions which they assume during the return of the shutter trigger from its fully depressed position to the position shown in FIG. 8.

Referring now to FIG. 1 of the drawings, the subject camera comprises a body housing 11, including a front wall 12, an end wall 13 and a top wall 14. The image forming objective lens 15 of the camera is supported by the forward wall 16 of lens housing 17, which also houses the camera shutter (not shown) operated in a manner known per se by upward movement of shutter lever 18. As previously mentioned, the lens housing and its associated structures may be supported for retractile movement relative to body housing 11, from the extended position shown in solid lines to the retracted position illustrated in broken lines. In such a construction, resilient means may be employed to move the lens housing to its extended position upon release of an appropriate latch mechanism. However, since the present invention does not involve the particular structure employed for supporting and moving the rectractile lens housing 17, such details are not shown, reference being made to an appropriate example of such a construction disclosed in commonly assigned copending U.S. application Ser. No. 610,055 entitled Photographic Camera With Rectractile Lens Housing filed on even date herewith in the names of James F. Scudder and Frederic A. Mindler.

A main support member or frame 19, which is formed preferably of molded plastic or die cast metal, is enclosed within body housing 11 and includes a curved wall portion 21 defining, rearwardly thereof, a compartment for the film take-up spool or the film take-up chamber of a film magazine. A similar curved wall portion, not shown, is provided at the opposite end of the support member, to define a similar compartment for the film supply spool or the corresponding film supply chamber of a film magazine.

Film winding mechanism

The film winding mechanism of the camera comprises a winding knob 22 attached to a gear 23 rotatably supported on the vertical portion of a support plate 24 adjacent end wall 13 of the camera housing. Gear 23 meshes with rotatable vertical idler gear 25, which also is supported on the vertical portion of support plate 24 by a bearing member 26. A horizontal idler gear 27 is rotatably supported atop the horizontal portion of support plate 24 by a bearing member 28, with its teeth meshing at right angles with those of vertical idler gear 25. Horizontal idler gear also meshes with a second horizontal gear 29, affixed to vertical shaft 31 extending through and rotatably supported by the horizontal portion of plate 24.

Below the horizontal portion of support plate 24, shaft 31 is connected in rotatable driving relation to a ratchet wheel 32 and to the film take-up spool positioned coaxially thereof, as shown at 33 in FIGS. 2 and 3. If desired, the means employed to connect the film take-up spool to shaft 31 may be movable into and out of engagement with the spool in response to operation of a cover door latching mechanism including a door release button 30, as disclosed for example in U.S. Patent No. 3,106,142, issued Oct. 8, 1963.

From the foregoing description, it is apparent that, as viewed in FIGS. 1 through 3, clockwise rotation of the winding knob imparts counterclockwise motion to shaft 31 and hence to the film take-up spool 33, thereby winding the elongate filmstrip 34 onto the take-up spool from the film supply spool 35. To prevent counterclockwise rotation of the winding knob, a ratchet pawl (not shown) can be employed in cooperation with any of the rotatable members of the gear train, as is common practice in roll film cameras. It should be noted, however, that the illustration of conventional film supply and take-up spools in FIGS. 2 and 3 is for illustrative purposes only, inasmuch as the film may be housed in a film magazine.

Film metering mechanism

Between the film spools 33, 35 (or the magazine film chambers), the film strip is supported in flat condition in the focal plane of the extended camera lens against a flat backing plate 36, by film guide members 37 as shown in FIGS. 2 and 3. As previously discussed, however, the backing plate and the film guide members need not be incorporated in the camera itself, but may comprise elements of a film magazine. As is most clearly shown in FIGS. 5 through 7, the upper edge of the filmstrip 34 is provided with a plurality of metering holes, two of which are shown at 38 and 39. Each such metering holes bears the same predetermined relation to the adjacent film exposure area associated therewith. In front of the metering hole edge of the filmstrip 34 and above the flatly supported area of the filmstrip, the main support member 19 defines a boxlike structure comprising side wall members 41 and 42 connected by a rearward wall member 43 provided with a metering pawl opening 44. This structure serves to support the metering pawl assembly, comprising a metering pawl member 45 and a resilient tongue member 46, such members being shown in detail in aligned but spaced-apart relation to one another in FIG. 4. As is best illustrated by reference to FIGS. 4 and 5, the metering pawl member 45 is loosely received at one of its ends in a vertical slot 47 in side wall member 42, with a rounded pawl 48 located toward the opposite free end of the metering pawl member and extending rearwardly through opening 44. The resilient tongue member 46 is supported at each of its ends ahead of and in generally parallel relation to the metering pawl member 45 by opposed vertical slots 49 and 51 in wall members 41 and 42, respectively. The resilient tongue member 46 includes a rearwardly projecting leaf spring arm 52 which engages the metering pawl member 45 adjacent the rearwardly bent area 53 of the metering pawl member to maintain the adjacent end of that member in slot 47 and to exert a slight resilient force urging the opposite free end of the pawl member 45 toward the filmstrip 34.

After the shutter has been operated to produce an exposure and before the filmstrip 34 has been advanced, the various components of the metering assembly assume the positions shown in FIGS. 2 and 5. At such time, hole 38 is aligned with the rounded pawl 48, which projects therethrough into a recess 54 in backing plate 36, to a position defined by the abutment of the rearwardly bent end portions 55 of the metering pawl member 45 against the adjacent forward surface of wall member 43. At this stage of the metering cycle, a resilient tongue arm 56 of member 46, is in light resilient contact with a forwardly projecting spacer lug 57 on the metering pawl member.

A latch arm 58 is pivotally supported on member 19, or on another stationary element of the camera, by a pivot member 59, and includes a latching projection 61 provided with a depending latching ear 62 laterally adjacent edge surfaces 63 and 64 of the metering pawl member and the resilient tongue arm, respectively. At its forward end, latch arm 58 is connected to a wire linking member 65 extending downwardly in hooklike fashion through hole 66. The opposite end of the linking member is bent downwardly in a similar manner and extends through a slot 67 in the horizontal portion of support plate 24. Beneath the support plate, the hooklike end of the linking member 65 is attached to a light tension spring 68, shown in FIG. 1, connected at its opposite end to the vertical portion of support plate 24 at hole 69.

At the stage of the operating cycle previously discussed, as shown in FIGS. 1, 2 and 5, the depending ear 62 on latch arm 58 is engaged by edge surface 64 of tongue arm 56 to retain the latch arm in its illustrated position against the influence of spring 68. In this position, ratchet engaging tooth 71 on the latch arm is spaced from the teeth of the ratchet wheel 32, which is therefore rotatable by the winding knob. As the knob is rotated, to wind the filmstrip onto the take-up spool, hole 38 moves out of alignment with recess 54 and with the metering pawl 45. Such movement causes the edge of the hole 38 to engage the adjacent sloped edge of the pawl and cams the pawl member forwardly to the position shown in FIG. 6, in which the pawl bears against the forward surface of the filmstrip 34 between the metering holes. As the free end 48 of the pawl member moves to this forward position, the tongue arm 56 is displaced forwardly by lug 57, to move surface 64 out of engagement with depending ear 62, whereupon spring 68 moves the latch arm 58 to an intermediate position defined by the abutment of ear 62 against edge surface 63 of the pawl member. In this intermediate position, ratchet engaging tooth 71 is closer to the ratchet wheel than shown in FIG. 2, but not yet in engagement therewith.

As the film winding continues, the next metering hole, 39, is brought into alignment with the pawl 48, thereby allowing the pawl member 48 to reassume its previous position, under the influence of spring arm 52, thereby disengaging edge surface 63 from ear 62. However, as shown in FIG. 6 and FIG. 7, due to the previous movement of the latch arm to its intermediate position, the tongue arm 56 is blocked from returning to its former position by the forward edge of the ear 62, which is now beyond edge surface 64. Accordingly, ear 62 is moved to the position shown in FIG. 7 as spring 68 showing in FIG. 1 moves the latch arm to the operative position shown in FIG. 3, in which tooth 71 is interposed between adjacent teeth of ratchet wheel 32 to block further winding of the film.

Shutter operating mechanism

The shutter operating mechanism, shown in FIGS. 1 and 8 through 11, includes a trigger member 72 slidably supported in an opening 73 through the horizontal portion of plate 24 and by a similar opening in a lower support member 74 attached to the support plate. The trigger member is provided at its upper end with a push button shoe 75, which is raised above the top wall 14 of the camera body housing as shown in FIG. 1 when the camera is ready for operation. If desired, the trigger mechanism may include means for retracting the trigger in response to retraction of the lens housing, as disclosed in commonly assigned copending U.S. application Ser. No. 610,055 entitled Photographic Camera With Retractile Lens and Shutter Trigger filed on even date herewith in the names of Dean M. Peterson, Charles E. Pickering and William Windle, Jr. Although the specific details of such a construction are not herein shown or described, the illustrated trigger member corresponds to the construction disclosed in the above-mentioned application by being provided with a latch member 76 attached thereto by a pivot pin 77 and including an ear 78 extending into a hole 79 in the trigger member. A spring 81, extending between pin 82 on latch member 76 and a stationary pin 83 attached to support plate 24, resiliently urges the trigger member toward the raised position shown in FIGS. 1 and 8.

A shutter operating member 84 is pivotally attached to support member 19 by stud 85, with arm 86 extending between shoulders 87 and 88 of trigger member 72 and latch member 76 respectively. By this arrangement, as the trigger is depressed from its raised position to a position in which the push button shoe is adjacent the camera body casing, shoulder 88 engages arm 86 and rotates member 84 from the position shown in FIG. 8 to that shown in FIG. 10.

To minimize the space required within the camera to accommodate the retracted lens housing and the shutter lever 18 supported thereby, lever 18 is located rearwardly of the lens housing with the end of the lever substantially in alignment with the adjacent lateral wall surface of the housing. Accordingly, the member employed to engage and raise the shutter lever 18 to actuate the shutter must be movable out of rearward alignment with the lens housing to allow retraction thereof. This is accomplished by pivotally attaching an intermediate lever 89 to shutter operating member 84 by means of a pivot member 91. When the mechanism is in the position shown in FIGS. 1 and 8, the horizontal lip 92 of the nose portion of the intermediate lever 89 is maintained against the upper surface 94 of support projection 95 on member 19 by a spring 96 extending between ear 97 on the intermediate lever and hole 98 in mounting arm 99 of support plate 24. In this position, nose 93 of lever 89 is laterally out of alignment with shutter lever 18 and with the path of movement of the lens housing during its retraction. Since lip 92 is supported by surface 94, the force exerted by spring 96 tends to exert a clockwise influence on member 85 through pivot member 91, thereby resiliently maintaining member 84 in its illustrated position.

As the shutter trigger is depressed, shoulder 88 of member 76 moves arm 86 downwardly, pivoting member 84 in a counterclockwise direction. Such movement of member 84 rotates pivot member 91 relative to stud 85, thereby sliding lip 92 along surface 94 to position nose 93 beneath shutter lever 18. When member 84 has rotated sufficiently to move edge 101 thereof into engagement with the trailing lip 102 of member 89, further movement of member 84 raises the nose portion 93 to engage and raise the shutter lever. FIG. 9 shows the relative positions of the various components when nose portion 93 of member 89 has thus raised the shutter lever sufficiently to operate the shutter. During further depression of the trigger to its lowermost position, as shown in FIG. 10, the continuing upward movement of nose 93 causes it to disengage the end of the shutter lever 18, which is then returned to its initial location in abutment with stop pin 103 by spring 104. When the trigger is released after having been depressed fully, spring 81 returns the trigger to its extended position, thereby allowing member 89 and the intermediate lever also to return to the positions shown in FIG. 8 due to the engagement of arm 86 by shoulder 87 and to the resilient force of spring 96. During such return movement, nose 93 of lever 89 engages the sloping top edge of the shutter lever but bypasses such engagement by rocking lever 89 to the position shown in FIG. 11, in which trailing lip 102 has moved out of contact with edge 101. When the nose portion of the intermediate lever has moved past the shutter lever, lip 92 re-engages surface 94 of support projection 95 and the various components reassume the relative positions shown in FIG. 8.

Double exposure prevention mechanism

The mechanism employed to prevent a double exposure of a film exposure area comprises a trigger blocking member 105, shown in FIGS. 1, 2 and 3, pivotally attached to the horizontal portion of support plate 24 by a pivot pin 106. The blocking member is biased toward the position shown in FIGS. 1 and 2 by a wire spring 107 (FIG. 1), passing through hole 108 in the blocking member and supported by pins 109 and 111 on support plate 24. In this position, an inwardly projecting arm 112 of the blocking member abuts laterally against the adjacent end of wire linking member 65 and nose portion 113 of the blocking member extends into hole 79 in the trigger member to block depression thereof.

When latch arm 58 moves to its intermediate position, as previously described, in response to forward movement of pawl 48, linking member 65 moves slightly to the left as viewed in FIGS. 1, 2 and 3. During such movement, the end of the linking member, extending downwardly through slot 67, remains in the slot portion shown at 114, which is generally parallel with blocking member arm 112. Therefore, such movement of the linking member does not alter significantly the position of the blocking member. However, when pawl 48 enters the metering hole associated with the next exposure area, spring 68 moves the latch arm and the linking member further to the left, as shown in FIG. 3. During such movement, the end of the linking member adjacent arm 112 enters the sloped portion of slot 67 shown at 115 and is thereby deflected in a forward direction, thereby pivoting blocking member 105 against the influence of spring 107 to withdraw nose portion 113 from blocking relation to the trigger member. Ear 78, which is shown adjacent nose portion 112 in hole 79 in the trigger member, is employed as a supplemental means for displacing the blocking member from hole 79 upon rearward movement of the ear in the hole, if the camera is provided with a retractile trigger mechanism as disclosed in the above-mentioned Peterson et al. application. Thus, it is apparent that the trigger 72 remains blocked during the above-described operating cycle until a new exposure area has been advanced into exposure position, whereupon the trigger is released and may be depressed to effect the next exposure.

Mechanism resetting means

The foregoing explanation described the operation of the various camera elements during an operating cycle commencing after an exposure has been made and before the film has been advanced (FIG. 2), at which time the trigger is blocked, and ending when the film has been advanced to bring a new exposure area into its exposure position and to release the trigger (FIG. 3), whereupon the cycle is completed by depression of the trigger to produce another exposure. In order that the cycle will be repeated for each film exposure area, it is necessary to restore the mechanism to the condition shown in FIG. 2 following each exposure. This is accomplished by means of the resetting device shown in FIGS. 1 and 8 through 11, comprising a return lever 116 and a depending return ear 117 on latch arm 58. As is most clearly shown in FIGS. 8 through 11, the return lever 116 is pivotally attached to shutter operating member 84 at pivot 118 and is biased in a counterclockwise direction thereupon by a hairpin spring 119, passing around a stud 121 and engaged at its opposite ends, respectively, with the return lever and with an ear 122 on member 84. An inwardly bent tongue 123 on the return lever limits its counterclockwise movement to the position shown in FIG. 8, by abutting against the adjacent edge surface 124 of member 84.

When the mechanism is at the stage of the operating cycle shown in FIG. 3, just prior to depression of the trigger, the depending ear 117 on the latch arm 58 is at its extreme left position, in the relation to the shutter operating mechanism shown in FIG. 8. When the trigger is depressed, member 84 is pivotally moved progressively to the position shown in FIGS. 9 and 10, as previously described. During such movement, the upper surface 125 on projecting portion 126 of the return lever 116 engages the lower edge of depending ear 117, which, being immovable in an upward direction, causes the return lever to pivot about rivet 118 against the influence of spring 119, as shown in FIG. 9. As the depression of the trigger continues, the return lever disengages depending ear 117 and reassumes its initial relation to member 84, as shown in FIG. 10, without having altered the position of the latch arm 58. Hence, when the trigger has reached its fully depressed position, thereby effecting an exposure of the film, the latch arm 58 and the metering and double exposure prevention systems associated therewith still remain as shown in FIG. 3. When the trigger is released, member 84 rotates in a clockwise direction and brings the end of projecting portion 126 of the return lever into contact with the face surface 127 of depending ear 117. Such engagement between the depending ear and the return lever tends to exert a counterclockwise force on the return lever, which cannot move further in that direction relative to member 84 because of the abutment of tongue 123 against edge surface 124. Therefore, as shown in FIG. 11, the continued clockwise movement of member 84, as the trigger returns to its raised position, causes the depending ear to be displaced to the right from its former position shown in broken lines, thereby moving latch arm 58 and the various components associated therewith back to the respective positions shown in FIG. 2. Referring again to FIGS. 5, 6 and 7, FIG. 7 shows the position of the latching ear 62 when the latch arm is in the position shown in FIG. 3, at which time tongue arm 56 is held forwardly by the forward edge of the latching ear, located to the left of edge surface 64 of the tongue arm. However, when the latch arm is displaced by the return lever as shown in FIG. 11, latching ear 62 is moved slightly past edge surface 64 of the tongue arm, allowing the tongue arm and the latching ear to reassume the positions shown in FIG. 5 when the return lever 116 disengages depending ear 117 during the final upward movement of the trigger.

From the foregoing, it is apparent that the invention provides for film winding, metering and double exposure prevention by means of a reliable and relatively simple mechanism particularly adaptable to compact cameras and compatible with a retractile lens housing and trigger system. However, since various modifications may be made without departing from the spirit of the invention, the foregoing detailed description of a preferred embodiment is to be considered as illustrative only and not as limiting the scope of the invention as defined by the appended claims.

We claim:

1. In a photographic camera using an elongate strip of roll film having a plurality of metering holes spaced therealong, said camera comprising:
   (a) exposure means,
   (b) means for advancing said strip to move successive areas thereof into alignment with said exposure means,
   (c) a resiliently biased movable pawl engageable with said strip and sequentially movable into and out of said holes during advancement of said strip by said strip advancing means, and
   (d) a disabling member movable between a first position wherein said disabling member disables said strip advance means, and a second position permitting strip advance,
the improvement of latching means comprising:
   (e) a first latching member coupled to said pawl for movement therewith, said member including means defining a first latch surface thereon;
   (f) a second latching member including means defining a second latching surface thereon;
   (g) a latching element coupled to said disabling member for movement therewith, the latching element defining surface means engageable with said second latching surface to retain said disabling member in said second position;
   (h) spacer means between said latching members for moving said second latching member to disengage said second latching surface from said surface means when said pawl is moved out of one of said holes, whereby said disabling member moves to an intermediate position defined by the engagement of said surface means with said first latching surface; and
   (i) blocking means for retaining said second latching surface out of latching engagement with said surface means during movement of said first latching surface out of engagement with said surface means when said pawl enters a succeeding one of said holes, to release the disabling member from said latching means for movement to said first position.

2. A camera according to claim 1 and further comprising:
   (a) shutter operating means,
   (b) a movable trigger for moving said shutter operating means,
   (c) a trigger blocking member movable between a released position and a blocking position in which said trigger blocking member limits movement of said trigger, and
   (d) co-ordinating means for locating said trigger blocking member in said blocking position while said disabling means is in said second position and for locating said blocking member in said released position when said disabling means moves to said first position.

3. A camera according to claim 1 and further comprising:
   (a) shutter operating means movable in
      (1) a shutter actuating direction and
      (2) a return direction, and
   (b) resetting means for moving said disabling member to said second position in latched engagement with said second latching member by said latching element in response to movement of said shutter operating means in said return direction.

4. In a camera using an elongate strip of photographic film provided with spaced metering holes, said camera including:
(a) image forming means,
(b) a mechanism support member,
(c) movable film advancing means for moving said film along a plane in predetermined relation to said image forming means,
(d) disabling means movable to
   (1) a first position in blocking engagement with said film advancing means for disabling said film advancing means, from
   (2) a second position out of blocking engagement with said film advancing means, through an intermediate position out of blocking engagement with said film advancing means,
(e) means for urging said disabling means toward said first position,
the improvement comprising:
(f) a first latch member including means defining a metering pawl and a first latching surface, said metering pawl and said first latching surface being substantially immovable in the direction of movement of said film and movable in a direction transverse to said plane between a first position in which said pawl traverses said plane by extending through one of said holes aligned with said pawl and a second position in which said pawl contacts said film between perforations therein as said film moves along said plane;
(g) first resilient means urging said pawl and said first latching surface toward said first position;
(h) edge means defining a cam surface on said pawl and engaged by said film to displace said pawl and said first latch surface from said first position to said second position as the hole aligned with said pawl is moved out of alignment therewith by movement of said film by said film advancing means;
(i) a second latch member including a second latching surface movable between a first location and a second location;
(j) second resilient means urging said second latch member toward said first location;
(k) spacer means for moving said second latch member to said second locatiton in response to movement of said pawl and said first latch surface to said second position;
(l) a latching element connected to said disabling member for retaining said disabling member
   (1) in said second position by engagement of said element with said second latch surface when said second latch surface is in said first location, and
   (2) in said intermediate position by engagement of said element with said first latch surface when said first latch surface is in said second position; and
(m) abutment means associated with said latching element for retaining said second latch surface in said second location while said disabling member is in said intermediate position.

5. A camera according to claim 4 and further comprising a movable trigger member and a trigger blocking member movable between a released position and a blocking position in which said blocking member limits movement of said trigger, and means operatively connecting said blocking member with said disabling means for moving said blocking member to said blocking position in response to movement of said disabling means to said second position.

6. A camera according to claim 4 in which said first latch member comprises a rigid member with said pawl and said first latching surface located thereon adjacent one end thereof, said latch member being pivotally supported at its opposite end by said support member forwardly of and in generally parallel relation to said plane, said second latch member being supported forwardly of said first latch member in generally parallel relation thereto and including a resilient arm movably supporting said second latch surface at its free end in spaced alignment with said one end of said rigid member.

7. A camera according to claim 6 in which said first latching surface is defined by a lateral edge of a first upwardly extending ear on said first latch member adjacent said pawl, said second latching surface being defined by a lateral edge of a second upwardly extending ear on the free end of said resilient arm, said first latching surface being spaced rearwardly from said second latching surface and displaced therefrom in the direction in which said disabling member moves from said second position to said first position.

8. A camera according to claim 7 in which said latch element comprises a depending ear on said disabling member in engageable alignment with said first latching surface when said first latch member is in said second position and with said second latching surface when said second latch member is in said first location, said abutment means comprising a forward edge surface on said depending ear adapted to engage a rearward surface of said second upwardly extending ear to retain said second latch member in said second location when said depending ear is engaged with said first latching surface.

9. A camera according to claim 6 in which said support member defines upstanding wall members adjacent opposite ends of said latch members, said wall members including means defining a first slot pivotally supporting said opposite end of said first latch member and opposed second slots receiving and immovably supporting said second latch member.

10. A camera according to claim 9 in which said second latch member includes a second resilient arm adapted to engage said first latch member adjacent said opposite end thereof to movably retain said opposite end in said first slot and to bias said one end toward said plane.

11. In a photographic camera comprising:
(a) a film winding and metering mechanism including a disabling member movable between a first position and a second position;
(b) a shutter operating member movable between a first position and a shutter operating position;
(c) a trigger manually movable from an extended position to a depressed position and resilient means to return said trigger from said depressed position to said extended position;
the improvement comprising:
(d) an intermediate member pivotally movable in a first direction by movement of said trigger from said extended position to said depressed position and in a second direction by movement of said trigger from said depressed position to said extended position;
(e) a shutter operating lever pivotally supported on said intermediate member to engage and move said shutter operating member from said first position to said shutter operating position during movement of said intermediate member in said first direction; and
(f) a reset lever pivotally supported by said intermediate member, said reset lever engaging and bypassing said disabling member in said first position thereof during movement of said intermediate member in said first direction and re-engaging and displacing said disabling member from said first position to said second position during movement of said intermediate member in said second direction.

(References on following page)

References Cited

UNITED STATES PATENTS

| | | | |
|---|---|---|---|
| 904,005 | 11/1908 | Niéll | 95—31 |
| 2,169,001 | 8/1939 | Mihalyi | 242—71.4 |
| 2,829,573 | 4/1958 | Jacobson | 95—31 |
| 2,853,929 | 9/1958 | Kovarik | 95—31 |
| 3,148,605 | 9/1964 | Peterson | 95—31 |

NORTON ANSHER, Primary Examiner

D. S. STALLARD, Assistant Examiner